US005938251A

United States Patent [19]

Watanabe

[11] Patent Number: 5,938,251

[45] Date of Patent: Aug. 17, 1999

[54] POWERED CLOSING DEVICE FOR A VEHICLE DOOR WITH A SAFETY MECHANISM

[75] Inventor: Hirofumi Watanabe, Yamanashi-ken, Japan

[73] Assignee: Mitsui Kinzoku Kogyo Kabushiki Kaisha, Tokyo, Japan

[21] Appl. No.: 08/862,307

[22] Filed: May 23, 1997

[30] Foreign Application Priority Data

May 24, 1996 [JP] Japan .................................... 8-153492

[51] Int. Cl.[6] ........................................................ C05C 3/06

[52] U.S. Cl. .................................... 292/201; 292/DIG. 23

[58] Field of Search ..................................... 292/201, 216, 292/336.3, DIG. 23, DIG. 43

[56] References Cited

U.S. PATENT DOCUMENTS 5,154,457 10/1992 Watanabe ......................... 292/DIG. 23
5,288,115 2/1994 Inoue et al. ............................. 292/216
5,308,128 5/1994 Portelli et al. .......................... 292/216
5,520,425 5/1996 Dowling .................................. 292/201
5,564,761 10/1996 Mizuki et al. .......................... 292/201
5,709,420 1/1998 Umino .................................... 292/216

FOREIGN PATENT DOCUMENTS 2 309 486 7/1997 United Kingdom .

*Primary Examiner*—Darnell M. Boucher
*Assistant Examiner*—Gary Estremsky
*Attorney, Agent, or Firm*—Browdy and Neimark

[57] ABSTRACT

A powered closing device for a vehicle door comprises a latch engageable with a striker, a ratchet for maintaining the engagement between the latch and the striker, an output member rotated by a motor when the latch comes into a half-latched position, an intermediate lever connected to the latch for displacing the latch from the half-latched position to a full-latched position, a connecting member provided between the output member and the intermediate lever, a cancelling lever having a first arm connected to an opening handle of the door and a second arm in which a cancelling cam surface is formed. The cancelling cam surface is brought into contact with the connecting member to disconnect the output member and the intermediate lever when the opening handle is operated. The cancelling cam surface is overlapped with the output member when the opening handle is not operated and moved in a direction apart from the first shaft when the opening handle is operated.

6 Claims, 4 Drawing Sheets

POWERED CLOSING DEVICE FOR A VEHICLE DOOR WITH A SAFETY MECHANISM

TECHNICAL FIELD AND BACKGROUND OF THE INVENTION

The present invention relates to a powered closing device for closing a vehicle door from its half-latched position to its full-latched position by the power of a motor and, in particular, to a safety mechanism of the powered closing device.

A conventional powered closing device has a safety mechanism which interrupts a closing operation of the powered closing device when a hand of the operator or the like is accidentally caught between a vehicle door and a vehicle body while the vehicle door is being moved toward its full-latched position by the power of a motor. For example, Japanese Laid-open Patent Gazette No. 7-180416 (equivalent to U.S. Pat. No. 5,520,425) published on Jul. 18, 1995 describes a powered closing device which comprises a latch engageable with a striker fixed to a vehicle body, a ratchet engageable with the latch for maintaining the engagement between the latch and the striker, an output member rotatably mounted on an attaching shaft, a motor for rotating the output member when the latch comes into a half-latched position, an intermediate lever operatively connected to the latch for displacing the latch from the half-latched position to a full-latched position when rotated a connecting member having a connecting position in which a rotation of the output member is transmitted to the intermediate lever and a disconnecting position in which the rotation of the output member is not transmitted to the intermediate lever, a cancelling lever connected to an opening handle of a vehicle door. The cancelling lever causes the connecting member to displace from the connecting position to the disconnecting position when the opening handle of the door is operated, thereby the latch is released from the motor.

The above mentioned closing device is formed thin as a whole to be easily installed within the inner space of the door. However, the cancelling lever is arranged such that it is not overlapped with the output member, so the conventional device has a disadvantage of becoming larger in area. Further, the cancelling lever is arranged such that it is moved toward the attaching shaft of the output member when the opening handle is operated, so the connecting member is formed into an elongated link-like shape having a length approximately equivalent to a diameter of the output member.

SUMMARY OF THE INVENTION

It is therefore an object of the present invention to provide a powered closing device which can be formed smaller in area. To achieve this object, a cancelling lever of the present invention is arranged such that it overlaps an output member when an opening handle is not in operation, and that it is projected away from the peripheral surface of the output member when the opening handle is operated.

It is another object of the present invention to provide a powered closing device in which a connecting member for connecting the output member and an intermediate lever can be formed shorter. To achieve this object, a cancelling cam surface of the cancelling lever is arranged such that it is moved in a direction apart from an attaching shaft of the output member to make contact with a roller of the connecting member.

BRIEF DESCRIPTION OF THE DRAWINGS

The above and other objects, features and advantages of the present invention will become apparent from the detailed description of the preferred embodiments found below with reference to the accompanying drawings in which.

DETAILED DESCRIPTION OF THE PREFERRED EMBODIMENTS

Hereinafter, the preferred embodiment of the present invention will be described in detail by referring to the accompanying drawings.

Figure 1:
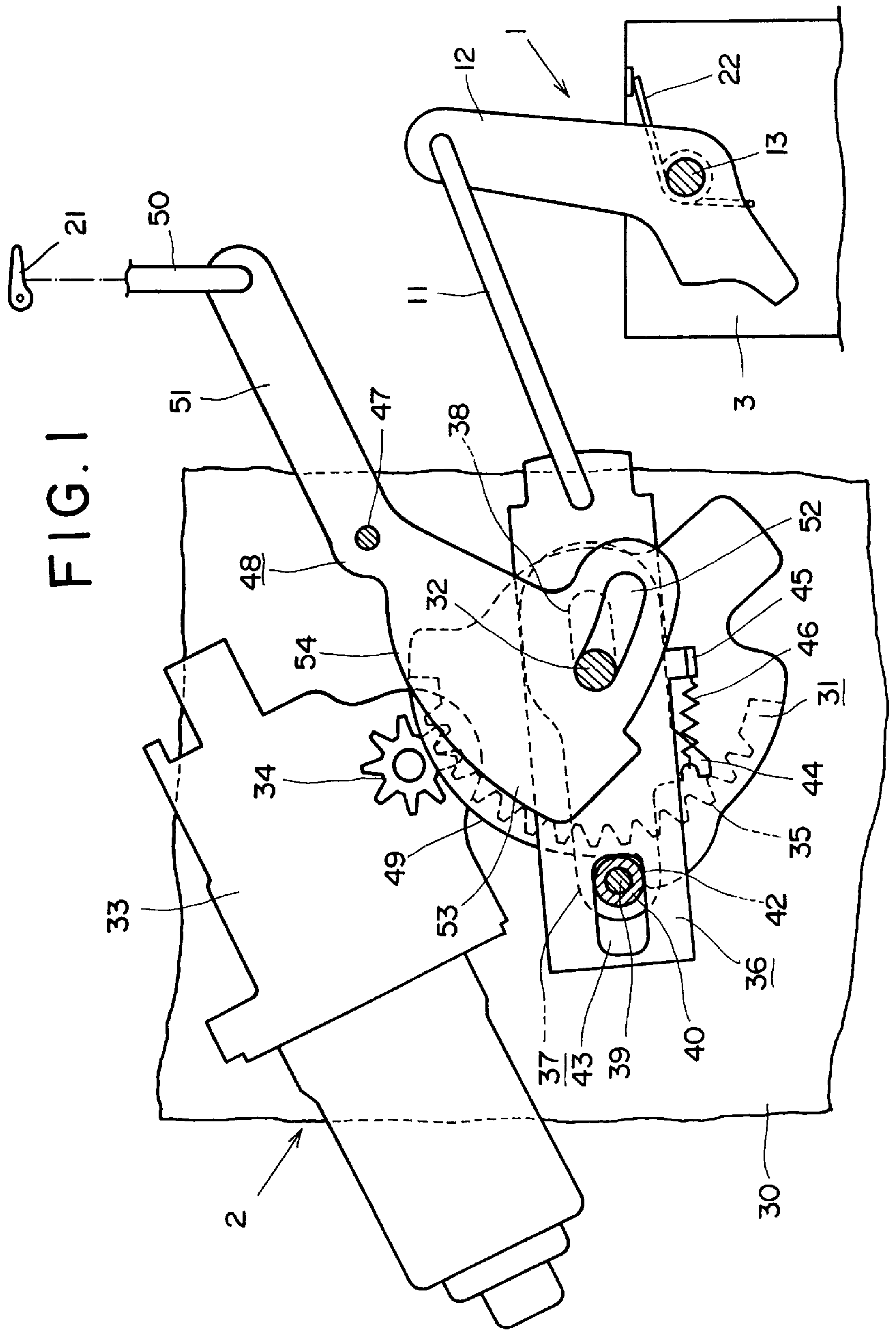
FIG. 1 is a view showing a powered closing device which has a power unit and a latch assembly in accordance with the present invention.

As shown in FIG. 1, a powered closing device of the present invention has a latch assembly 1 fixed to a vehicle door (not shown) and a power unit 2 for supplying mechanical power to the latch assembly 1.

Figure 2:
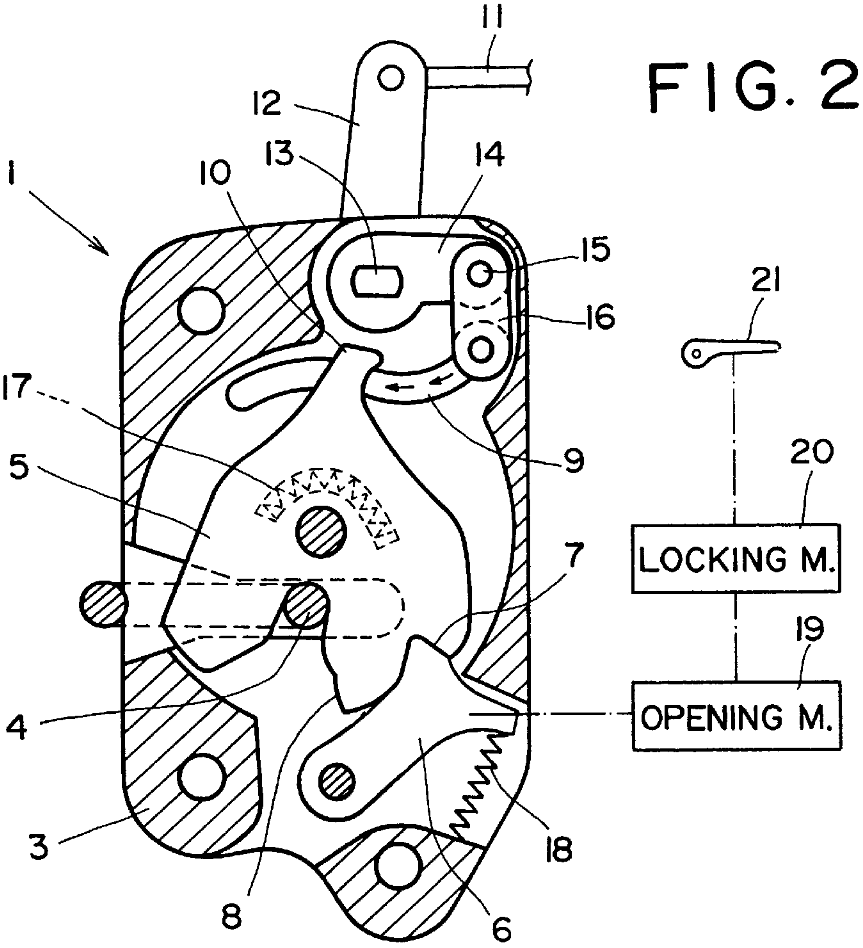
FIG. 2 is a partly sectional view of the latch assembly.
Figure 4:
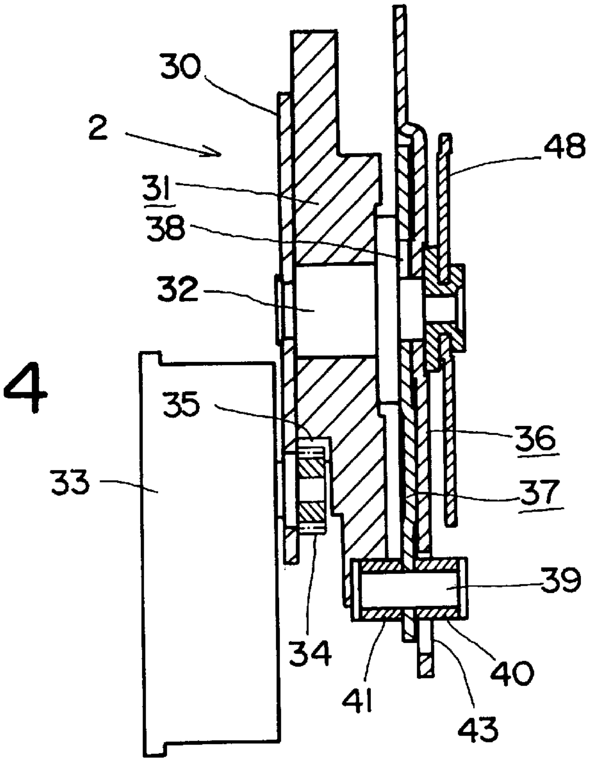
FIG. 4 is a sectional view of the power unit.
Figure 3:
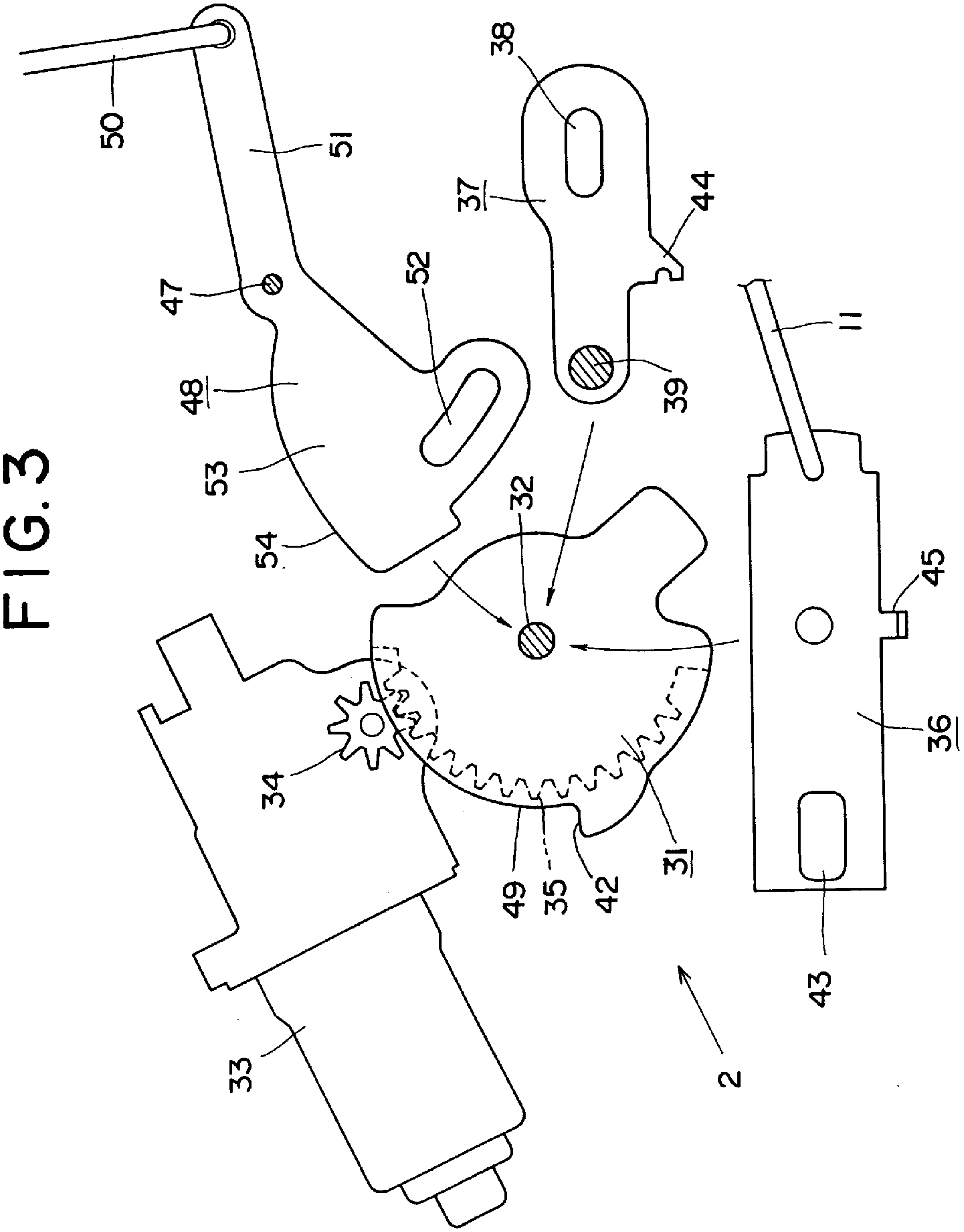
FIG. 3 is an exploded view of the power unit.

The latch assembly 1 is substantially similar to that described in U.S. Pat. No. 5,288,115 or U.S. Pat. No. 5,520,425 and, as shown in FIG. 2, has a latch body 3, a latch 5 which is engageable with a striker 4 fixed to a vehicle body (not shown), and a ratchet 6 for maintaining the engagement between the latch 5 and the striker 4 by engaging with the latch 5. The latch 5 is biased in a clockwise direction in FIG. 2 by resilient force of a latch spring 17, and the ratchet 6 is biased in a counterclockwise direction by resilient force of a ratchet spring 18. The latch 5 is rotated counterclockwise by the engagement with the striker 4, and the ratchet 6 is engaged with a first step portion 7 of the latch 5 when the latch 5 turns to a half-latched position in which the latch 5 is initially engaged with the striker 4 as shown in FIG. 2, and the ratchet 6 is engaged with a second step portion 8 of the latch 5 when the latch 5 turns to a full-latched position in which the latch 5 is completely engaged with the striker 4. With the latch 5 is formed a leg portion 10 which overlaps a guide groove 9 formed in the latch body 3 while the latch 5 is being positioned between the half-latched position and full-latched position.

The latch assembly 1 further has a lever 12 which is connected to the power unit 2 by way of a connecting rod or wire 11, a rotary arm 14 connected to the lever 12 through a coupling shaft 13 which penetrates the latch body 3, and a movable member 16 pivotally connected to a tip end of the rotary arm 14 by a connecting pin 15. The lever 12 is biased in a clockwise direction in FIG. 1 by resilient force of a lever spring 22. When the lever 12 is rotated by the mechanical power of the unit 2 through the connecting rod 11, the rotary arm 14 is also rotated by way of the coupling shaft 13, the movable member 16 is then moved along the guide groove 9. Accordingly, when the movable member 16 is moved by the power unit 2 while the latch 5 is in the half-latched position, the latch 5 is displaced into the full-latched position by the engagement of the movable member 16 and the leg portion 10, thereby closing the door completely.

On the rear side of the latch body 3, an opening mechanism 19 for releasing the ratchet 6 from the latch 5 and a locking mechanism 20 for displacing the latch assembly 1 between a locked state and an unlocked state are provided. Both of the mechanisms are conventionally well-known. The opening mechanism 19 is coupled to an opening handle 21 of the door by way of the locking mechanism 20 in such a manner that the opening handle 21 can not actuate the opening mechanism 19 in the locked state.

Next, the structure of the power unit 2 will be explained. A semicircle-shaped output member 31 is rotatably mounted on a base plate 30 of the power unit 2 by an attaching shaft 32. The output member 31 has a toothed portion 35 with which a gear 34 of a motor 33 is meshed. An elongated intermediate lever or rod lever 36 is rotatably supported on the attaching shaft 32 so that it is overlaps the output member 31. One end of the rod lever 36 is coupled with the connecting rod 11. A connecting member 37 is provided between the rod lever 36 and the output member 31 and is slidable in a longitudinal direction of the rod lever 36.

One end of the connecting member 37 is formed with a slot 38 into which the attaching shaft 32 is inserted. The connecting member 37 has at the other end a fixed pin 39 which is protruded from opposite sides of the connecting member 37. First and second rollers 40 and 41 are rotatably mounted on both sides of the fixed pin 39. An engaging surface 42 which is engageable with the second roller 41 is formed at the periphery of the output member 31. At the other end of the rod lever 36 is formed with a second slot 43 into which the first roller 40 is inserted. A roller spring 46 for causing the second roller 41 to come into contact with a peripheral surface 49 of the output member 31 is provided between a first projection 44 of the connecting member 37 and a second projection 45 of the rod lever 36. The rod lever 36 is biased in a counterclockwise direction in FIG. 1 by the resilient force of the lever spring 22 of the latch assembly 1. The second roller 41 is usually brought into contact with the engaging surface 42 of the output member 31 by the resilient forces of the lever and roller springs 22 and 46. The engagement between the second roller 41 and engaging surface 42 is released when the connecting member 37 is moved against the resilient force of the roller spring 46.

The rod lever 36 has a length approximately equivalent to a diameter of the output member 31. However, it will be appreciated that the length of the rod lever 36 can be shorter if the connecting rod 11 is coupled to the opposite end of the rod lever 36.

When the motor 33 is not energized at a standby mode, the output member 31 is in the position as shown in FIG. 1 by the action of the lever spring 22. In this state, when the latch 5 turns to the half-latched position from the unlatched-position due to a manual door closing operation, the motor 33 is energized to rotate the output member 31 clockwise, the connecting member 37 is then rotated by the engagement of the second roller 41 and the engaging surface 42, and the rod lever 36 is rotated clockwise due to the engagement between the first roller 40 and the second slot 43. When the rod lever 36 rotates, the lever 12 of the latch assembly 1 is rotated by way of the connecting rod 11, then the movable member 16 is moved along the guide groove 9 of the latch body 3 and brought into contact with the leg portion 10 of the latch 5 to turn the latch 5 from the half-latched position to the full-latched position.

Figure 5:
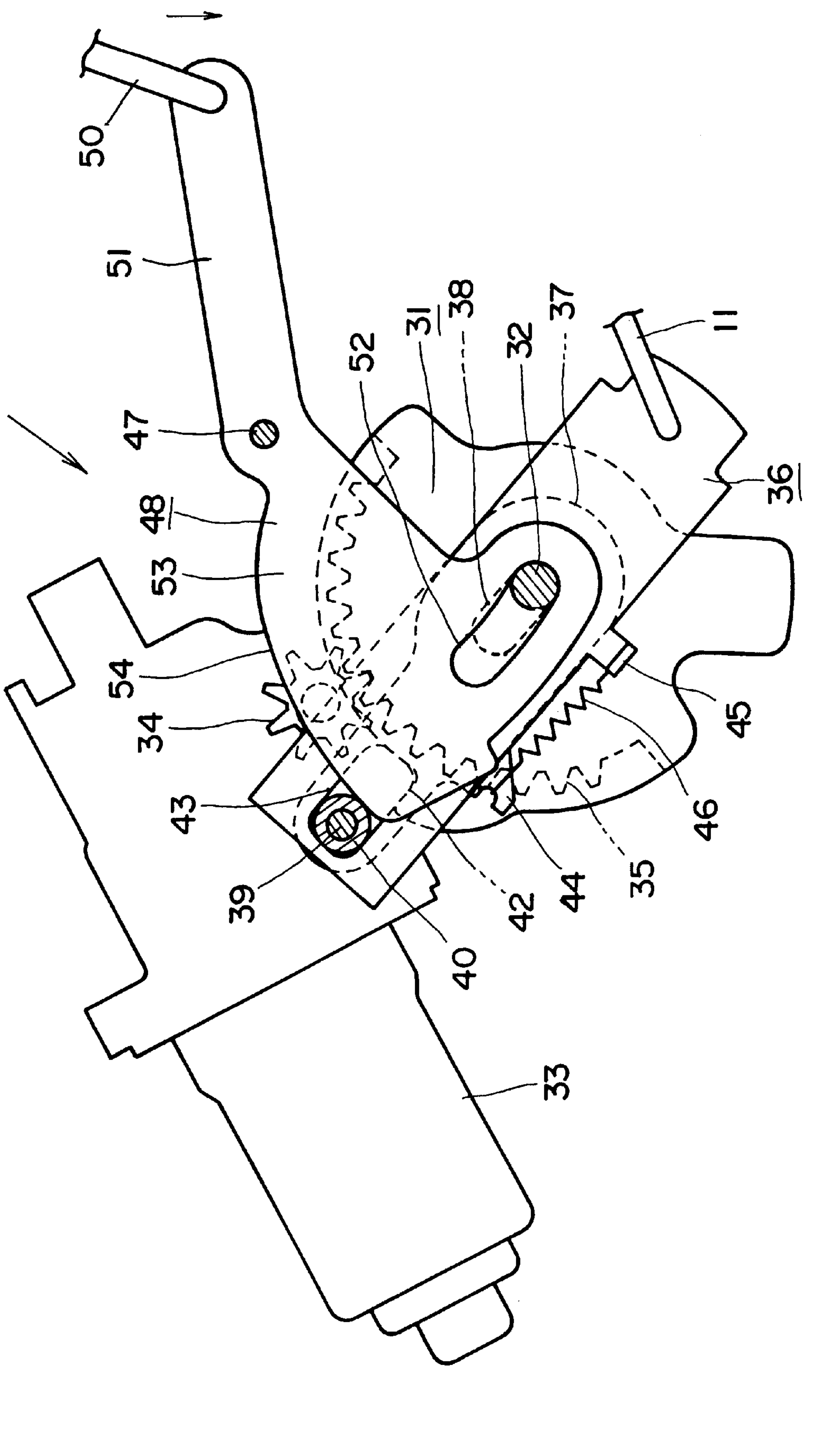
FIG. 5 is a view showing a state in which a connecting member is displaced into a disconnecting position due to an operation of a cancelling lever.

A cancelling lever 48 is rotatably mounted on the base plate 30 by a cancelling shaft 47 parallel to the attaching shaft 32. The cancelling lever 48 has a first arm 51 which is coupled with the opening handle 21 of the door by way of a door rod 50 and a second arm 53 which is provided with an arcuate slot 52 having a center about the cancelling shaft 47. The attaching shaft 32 is inserted into the arcuate slot 52 so that the rotational range of the cancelling lever 48 is defined by a gap between the shaft 32 and arcuate slot 52. When the opening handle 21 is not operated, the second arm 53 is in the position shown in FIG. 1 and is substantially overlapped with the output member 31 except its base portion adjacent to the cancelling shaft 47. An arcuate cancelling cam surface 54 is formed at one side of the second arm 53. When the opening handle 21 is operated, the cam surface 54 is moved in a direction apart from the attaching shaft 32 and projected from the peripheral surface 49 of the output member 31 as shown in FIG. 5. Accordingly, when the opening operation is performed by the opening handle 21 while the output member 31 is rotated by the motor 33, the cancelling cam surface is brought into contact with the second roller 41 of the connecting member 37 so as to slide the connecting member 37 against the resilient force of the spring 46, thereby the second roller 41 is released from the engaging surface 42 of the output member 31. This means that the power transmission of the power unit 2 is interrupted, the rotation of the latch 5 toward the full-latched position is stopped.

As mentioned above, the second arm 53 of the cancelling lever 48 is arranged such that it overlap the output member 31 when the opening handle 21 is not in operation, and that it is projected from the peripheral surface 49 of the output member 31 when the opening handle 21 is operated. Accordingly, the power unit 2 of the present invention can be formed compact.

Further, the cancelling cam surface 54 is arranged such that it is moved in a direction apart from the attaching shaft 32 to make contact with the roller 41, so that the connecting member 37 can be formed shorter.

While this invention has been described with reference to an illustrative embodiment, this description is not intended to construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A powered closing device for a vehicle door mounted on the vehicle body, comprising:

a striker adapted to be fixed to the vehicle body;

a latch adapted to be rotatably mounted on the vehicle door and engageable with the striker for shutting the vehicle door, said latch having an unlatched position in which the latch is disengaged from the striker, a half-latched position in which the latch is initially engaged with the striker, and a full-latched position in which the latch is completely engaged with the striker;

a ratchet adapted to be rotatably mounted on the vehicle door and engageable with the latch for maintaining the engagement between the latch and the striker;

an output member adapted to be rotatably mounted on the vehicle door by a first shaft;

a motor for rotating the output member when the latch reaches the half-latched position;

an intermediate lever adapted to be rotatably mounted on the vehicle door and operatively connected to the latch for displacing the latch from the half-latched position to the full-latched position when rotated;

a connecting member having a connected position in which rotation of the output member is transmitted to the intermediate lever and a disconnected position in which rotation of the output member is not transmitted to the intermediate lever; and a cancelling lever rotatably mounted on the vehicle door by a second shaft parallel to the first shaft and having a first arm adapted to be continuously connected to an opening handle of the vehicle door and a second arm on which a cancelling cam surface is formed, said cancelling cam surface being brought into contact with the connecting member to displace the connecting member to the disconnected position from the connected position when the opening handle is operated;

wherein said cancelling cam surface overlays the output member when the opening handle is not in operation and the cancelling cam surface is moved in a direction away from the first shaft when the opening handle is operated.

2. A powered closing device according to claim 1, wherein said connecting member is formed into an elongated link shape and has at one end an elongated slot into which the first shaft is inserted.

3. A powered closing device according to claim 1, wherein said cancelling lever has an arcuate slot with a radius around the second shaft, said first shaft being inserted into the arcuate slot.

4. A powered closing device for a vehicle door mounted on the vehicle body, comprising:

a striker adapted to be fixed to the vehicle body;

a latch adapted to be rotatably mounted on the vehicle door and engageable with the striker for shutting the vehicle door, said latch having an unlatched position in which the latch is disengaged from the striker, a half-latched position in which the latch is initially engaged with the striker, and a full-latched position in which the latch is completely engaged with the striker;

a ratchet adapted to be rotatably mounted on the vehicle door and engageable with the latch for maintaining the engagement between the latch and the striker;

an output member adapted to be rotatably mounted on the vehicle door by a first shaft;

a motor for rotating the output member when the latch reaches the half-latched position;

an intermediate lever adapted to be rotatably mounted on the vehicle door and operatively connected to the latch for displacing the latch from the half-latched position to the full-latched position when rotated;

a connecting member having a pin which is displaceable between a connected position in which rotation of the output member is transmitted to the intermediate lever and a disconnected position in which the rotation of the output member is not transmitted to the intermediate lever; and a cancelling lever adapted to be rotatably mounted on the vehicle door by a second shaft parallel to the first shaft and having a first arm adapted to be continuously connected to an opening handle of the vehicle door and a second arm in which a cancelling cam surface is formed, said cancelling cam surface being brought into contact with the pin to displace the pin to the disconnected position from the connected position when the opening handle is operated;

wherein said cancelling cam surface is positioned between the pin and the first shaft when the opening handle is not in operation and is moved in a direction away from the first shaft when the opening handle is operated.

5. A powered closing device according to claim 4, wherein said connecting member is formed into an elongated link shape and has at one end an elongated slot into which the first shaft is inserted, said pin being formed at the other end of the connecting member.

6. A powered closing device according to claim 4, wherein said cancelling lever has an arcuate slot with a radius around the second shaft, said first shaft being inserted into the arcuate slot.

* * * * *